United States Patent
Grabosch et al.

(10) Patent No.: US 10,155,672 B2
(45) Date of Patent: Dec. 18, 2018

(54) ELECTRO-DEIONIZATION CONTROL SYSTEM

(71) Applicant: Sartorius Lab Instruments GMBH & Co. KG

(72) Inventors: Matthias Grabosch, Bovenden (DE); Dennis Benjamin Groesche, Gottingen (DE); Fabian Walter, Northeim (DE); Gaston De Los Reyes, Somerville, MA (US)

(73) Assignee: SARTORIUS LAB INSTRUMENTS GMBH & CO. KG (DE)

( * ) Notice: Subject to any disclaimer, the term of this patent is extended or adjusted under 35 U.S.C. 154(b) by 532 days.

(21) Appl. No.: 14/758,274

(22) PCT Filed: Jan. 8, 2014

(86) PCT No.: PCT/US2014/010592
§ 371 (c)(1),
(2) Date: Jun. 29, 2015

(87) PCT Pub. No.: WO2014/110074
PCT Pub. Date: Jul. 17, 2014

(65) Prior Publication Data
US 2015/0336820 A1    Nov. 26, 2015

Related U.S. Application Data

(60) Provisional application No. 61/751,572, filed on Jan. 11, 2013.

(51) Int. Cl.
*B01D 61/48* (2006.01)
*C02F 1/00* (2006.01)
(Continued)

(52) U.S. Cl.
CPC ............ *C02F 1/008* (2013.01); *C02F 1/4695* (2013.01); *C02F 1/441* (2013.01); *C02F 2103/04* (2013.01);
(Continued)

(58) Field of Classification Search
None
See application file for complete search history.

(56) References Cited

U.S. PATENT DOCUMENTS 6,365,023 B1    4/2002    De Los Reyes et al.
6,391,178 B1    5/2002    Garcia et al.
(Continued)

FOREIGN PATENT DOCUMENTS

DE    10 2011 006944 A1    10/2012
EP    1 299 309 B1    1/2007
(Continued)

OTHER PUBLICATIONS

European Pharmacopoeia, 7.0 vol. 2, published Jul. 15, 2010, pp. 1-5.
(Continued)

*Primary Examiner* — Arun S Phasge
(74) *Attorney, Agent, or Firm* — Armis IP Law, LLC

(57) ABSTRACT

A method and apparatus for operating an electro-deionization (EDI) module produces purified water using a power supply controller to provide more efficient and accurate operation.

16 Claims, 12 Drawing Sheets

(51) Int. Cl.
*C02F 1/469* (2006.01)
*C02F 103/04* (2006.01)
*C02F 1/44* (2006.01)

(52) U.S. Cl.
CPC .. *C02F 2201/46* (2013.01); *C02F 2201/4614* (2013.01); *C02F 2201/46135* (2013.01); *C02F 2209/006* (2013.01)

(56) References Cited

U.S. PATENT DOCUMENTS

| | | | |
|---|---|---|---|
| 6,607,668 | B2 | 8/2003 | Rela |
| 6,726,822 | B2 | 4/2004 | Garcia et al. |
| 2005/0103631 | A1* | 5/2005 | Freydina ................ B01D 61/48 204/533 |
| 2008/0156710 | A1 | 7/2008 | Onota et al. |
| 2010/0282689 | A1 | 11/2010 | Ganzi et al. |

FOREIGN PATENT DOCUMENTS

| | | |
|---|---|---|
| EP | 2 402 290 A1 | 1/2012 |
| JP | 2007511348 | 5/2007 |
| JP | 2009 220062 | 10/2009 |
| WO | WO 2013/006438 A1 | 1/2013 |

OTHER PUBLICATIONS

Written Opinion of the International Searching Authority, dated Jul. 14, 2015, pp. 5.
European Grant Notification, Application No. 14 702 346.9, dated Sep. 5, 2017, pp. 1-59.
First Office Action by the Chinese Intellectual Property Office, Application No. 201480003317.9, dated Dec. 24, 2015, pp. 1-28.
Second Office Action by the Chinese Intellectual Property Office, Application No. 201480003317.9, dated Aug. 18, 2016, pp. 1-25.
Third Office Action by the Chinese Intellectual Property Office, Application No. 201480003317.9, dated Mar. 15, 2017, pp. 1-6.
Office Action by the Korean Intellectual Property Office, Application No. 10-2015-7018681, dated Nov. 29, 2016, pp. 1-21.
Office Action by the Korean Intellectual Property Office, Application No. 10-2015-7018681, dated Oct. 10, 2017, pp. 1-6.
Chinese Grant Notification, Application No. 201480003317.9, dated Nov. 29, 2017, pp. 1-6.
United States Filter Corporation, dated Oct. 8, 1999, pp. 1-28.
International Search Report, PCT/US2014/010592, dated Mar. 21, 2014, pp. 4.

* cited by examiner

ELECTRO-DEIONIZATION CONTROL SYSTEM

FIELD OF INVENTION

The present disclosure relates generally to the purification of water by electro-deionization (EDI), and more specifically to improved EDI methods and systems to deliver water within a range and at a target for water quality.

BACKGROUND

After the introduction of the first EDI systems in the late 1980s EDI was rapidly commercialized first for the production of high purity water in industrial processes, then for the deionization of non-ionic streams in industrial processes (e.g. urea desalting), and more recently for the production of high purity water in laboratory systems. The reason for the rapid adoption of EDI processes in such a wide range of applications is that EDI is among the most cost effective water purification processes for the removal of ionic contaminants to produce high purity water.

While different EDI systems operate over a water quality (WQ) range of 1~18 MΩ cm, individual EDI systems do not provide a selectable range or a target water quality nor are capable of maintaining a constant WQ during the useful life of the EDI modules. In contrast, single-stage reverse osmosis (RO) water purification systems cannot reliably produce water with a WQ above 1 MΩ·cm, and oftentimes lower than 0.1 MΩ·cm.

EDI systems used to produce high purity water in laboratories should be simple and inexpensive while simultaneously delivering high purity water reliably with minimum or no intervention by end-users. Furthermore, most of these systems use tap water as its feed water, which has a large variety of contaminants with wide ranges in their concentration depending on the location of the installation and the season of the year. All of these factors result in a very large range of ionic contaminants presented to a water purification system, both in the form of dissolved salts and weakly ionized species such as $CO_2$, silica and boron. As a result, the use of EDI processes for water purification systems in laboratories is among the most demanding application of EDI technology, since notwithstanding these challenges the water purification system should perform as a simple laboratory appliance.

U.S. Pat. No. 5,762,774 discloses the use of a suitable source of DC current (a variable current power supply) and a current ratio based on Faraday's Law and calculates the current applied to the EDI module based on the ionic load to the EDI module to achieve a "pre-specified level of deionization." The current ratios disclosed are from 1 to 50 times the minimum or Faraday current. The document does not specify a range for the water quality and is silent on how to address the start-up period after an extended idle time. Similarly, U.S. Pat. No. 6,365,023 discloses the use of a constant current power supply at a current ratio which is sufficiently high to ensure that the current applied to the module accommodates the large dynamic range of ionic loads encountered in laboratory systems. The ratios claimed are from 1 to 15 times the Faraday current.

U.S. Pat. Nos. 6,391,178 and 6,726,822 disclose the intermittent application of DC power to an EDI module to obtain WQ in a specified range of water quality. The documents disclose the use of either constant current or constant voltage power supplies to deliver water in a range of water quality by adjusting the amount of time the power supply is ON and OFF. The preferred proportional band control scheme described will not work as intended as it will either undershoot or overshoot the lower and upper bounds, respectively, of the specified range of water quality depending on how much current the power supply is delivering relative to the current required to maintain the WQ within the range. As such, the control scheme disclosed will lead to a constant cycling of the WQ above or below the specified range of water quality. Additionally, since sufficiently high currents need to be supplied to accommodate the highest possible ionic loads, for most installations a current much higher than necessary is applied during the part of the cycle when the power supply is ON, which increases the tendency to scaling within the EDI module. Moreover, the documents also do not disclose a method for achieving a constant WQ, and are silent on how to address the start-up period after an extended idle time.

U.S. Pat. No. 6,607,668 discloses an EDI-based water purification system utilizing RO pretreatment that further comprises a control system that monitors the WQ and "calculates the required electrical voltage and current required by the EDI module and automatically adjusts each to achieve optimum outlet water quality." It is unclear what adjusting "each" means since the electrical voltage and current cannot be adjusted individually. The document does not describe the method by which the control system calculates the required electrical voltage and current, and also does not set a range for the water quality and is silent on how to address the start-up period after an extended idle time.

Japanese Pat. No. 4,954,926 discloses a fuel cell system that reuses the condensation water to feed the reformer in the fuel cell, an EDI module to deionize the condensation water, and a variable voltage power source to drive the EDI module. In one embodiment disclosed in the document the conductivity of the deionized water is monitored and the voltage of the power source is varied to obtain a deionized water conductivity above a predefined threshold value. Another embodiment refers to the use of an ammeter to measure the current to the EDI module and adjusting the voltage of the power source to obtain a current above a threshold value defined beforehand. The preferred embodiment uses the two voltage levels supplied by the fuel cell itself—12 and 24 V—as the variable voltage power source obviating the need for a separate power supply. There is no hint to set a target and/or range for the water quality or how to address the start-up period after an extended idle time.

A conventional approach to control an EDI module in industrial processes is to drive it at constant voltage. These systems are custom-designed based on the feed water present in each installation, enabling specialized pretreatment and tailoring the size and configuration of the EDI module to the ionic load. Furthermore, these systems need to be professionally maintained ensuring that the feed water to the EDI module is constant. Finally, in these installations the EDI module can be cleaned to remove contaminants bound to the EDI module that reduce its effectiveness. With these measures the electrical impedance of the EDI module remains approximately constant, enabling a constant voltage power source to deliver an approximately constant current sufficient to effectively remove to the ionic load to the EDI module.

In contrast to industrial applications, where the impedance of an EDI module remains approximately constant, in laboratory applications the impedance may be different in each installation and gradually increases for all the reasons already stated: the tap water is different in different installations; a single standard system design needs to perform reliably in all installations; the module is not cleaned to remove "foulants." A module driven at constant voltage will initially be driven with a high current because it has a low impedance. As the module ages its impedance may increase with a proportional drop in current, eventually leading to insufficient current in some applications, and low water quality. As a result, the state of the art of EDI-based laboratory systems is to drive the EDI module with a constant current power source. These systems initially deliver very high WQ, often exceeding 17 MΩ-cm, but as the modules age the WQ gradually drops, eventually reaching very low values unacceptable to end-users, at which moment the module is replaced. Furthermore, since these systems are driven at the same constant current, for most installations the module is being driven with a current much higher than necessary, possibly 10 times higher, resulting in an increased tendency to scaling and a concomitant reduction in module life.

None of these conventional methods for the control of an EDI module are capable of delivering high purity water within a narrow range of water quality. Most of these conventional methods require a priori knowledge or some measurement of the ionic load to the EDI module, and these conventional methods deliver an excessive current to the EDI module increasing the risk of scaling and increasing the power consumption. Furthermore, none of these methods address the challenges unique to laboratory water systems: having a changing ionic load and being characterized by an intermittent operation; requiring a system that produces the target water quality day-in, day-out, and rapidly recovering the water quality after an extended idle period. In addition to the inability to deliver purified water within a user-specified range of water quality and at a user-specified target, two common problems encountered in the practice of EDI are inadequate ionic removal which leads to poor WQ and scaling which when unattended can quickly lead to premature failure of an EDI module. Both of these factors can lead to poor output water quality.

SUMMARY

Configurations disclosed herein substantially overcome the shortcomings of the prior art. A power supply controller and a controllable power supply determine the power necessary to deliver the baseline current and obtain the target water quality (also referred to as target for water quality). The water purification system disclosed herein seeks to control the power supply coupled to an EDI module to produce purified water within a specified range for the water quality and adjust a baseline current to produce purified water at a specified target water quality, and continuously adjust the baseline current to reflect changes in the purification factors.

Embodiments disclosed herein deliver purified water within a user-specified range of water quality (also referred to as range for the water quality) and at a user-specified target water quality within this range while extending the useful life of the EDI module. The present invention depends, in part, upon the discovery that, for a well-designed and constructed EDI module, a certain electrical current is necessary to produce water at a target water quality. This current depends on the inherent capacity of the EDI module and the product of the ionic content and the flow rate of the water feeding the EDI module, referred to hereafter as the ionic load to the EDI module, with a correspondingly higher current being required the higher the ionic load. The current required by an EDI module to deliver a target water quality is referred to herein as the baseline current, the control of which is described below in further detail.

Embodiments disclosed herein provide a method of operating an EDI module to produce purified water including receiving a range and a target within the range for a water quality value of the purified water, receiving a value for the water quality (WQ) of the purified water from a water quality sensor; applying power to the EDI module to bring the WQ within the received range and continuously adjusting the power to maintain the WQ near the received target within the range for water quality. Such a technique provides an EDI process for the reliable production of high purity water within a narrow range for the water quality under varying feed water conditions, varying performance of the purification steps, aging of the RO and EDI modules, and in the presence of undetermined species and concentrations of contaminants in feed water.

Other embodiments include techniques to: predetermine a transfer function to apply changes in power to the EDI module based on the WQ of the purified water and the received target water quality and operate the EDI module in closed loop operation using the predetermined transfer function; adjust the transfer function while operating the EDI module; probe the EDI module to determine the change in measured WQ as a function of a probing change in the power applied to the EDI module; and calculate the transfer function using at least one purification factor. Some techniques use a transfer function, which is a Proportional, Integral, Derivative (PID) function; other techniques may use a derivative function. Such techniques automatically adjust for the decline in performance of the EDI module so that the target water quality of the purified water is more quickly reached and more accurately maintained. Such a technique also provides a robust EDI-based purification process (i.e., one tolerant to extremes in operating conditions encountered in different installations as well as extremes due to seasonal cycles).

There are several ways to apply power to bring the WQ within the received range for the water quality. One technique includes applying one of a predetermined maximum initial power and a predetermined minimum initial power to the EDI module until the WQ is within the received range. Another technique includes determining an ionic load of feed water, predetermining for the EDI module a relationship between power requirements and the ionic load of the feed water and applying power to the EDI module to supply a current as a function of the feed water ionic load and the power requirements of the EDI module. A method of determining the feed water ionic load includes providing an EDI module with an approximately known excess capacity, applying a minimum power, measuring a time interval for a change in WQ and determining the feed water ionic load as a function of the time interval, the approximately known excess capacity of the EDI module and the applied power.

A technique to perform a soft restart includes saving a system state including a baseline current and restarting the EDI module initially using the baseline current. This step can be in between any of the steps of the inventive method, which means at the initial start or as restart between any of the main steps. Such a technique provides an EDI-based water purification process that rapidly recovers the WQ after periods of idle time.

A technique to continuously adjust the power to maintain the WQ near the received target for water quality includes predetermining a transfer function to apply changes in power to the EDI module based on differences in the WQ and the received target water quality and operating the EDI module in closed loop operation using the predetermined transfer function. This technique can also include adjusting the transfer function while operating the EDI module and can further include probing the EDI module to determine the change in measured WQ as a function of a probing change in the power applied to the EDI module and adjusting the transfer function.

In a further embodiment the method includes adjusting the transfer function while operating the EDI module by probing the EDI module to determine the change in measured WQ as a function of a probing change in the power applied to the EDI module. In still another embodiment, the received range and target within the range for a water quality value of the purified water are combined into a target; and the method further comprises first applying power to the EDI module to bring the WQ within the received target and then continuously adjusting the power and probing to maintain the WQ near the received target for water quality. In yet another embodiment, the transfer function is a Proportional, Integral, Derivative (PID) function or a derivative function.

In a further embodiment, predetermining a transfer function includes calculating the transfer function using at least one purification factor, and in another embodiment the at least one purification factor comprises at least one of: feed water ionic load; performance of reverse osmosis (RO) pretreatment of the feed water; and EDI module performance. In a further embodiment, the received range, the received target and a baseline current are parameters of the transfer function, and in a still further embodiment, the baseline current parameter is adjusted using a transfer function.

Another embodiment includes determining a lag time between changes in power application to the EDI module and changes in measured WQ value; and adjusting the transfer function to compensate for the lag time when adjusting the power to maintain the WQ near the received target for water quality.

In a further embodiment, applying power to the EDI module to bring the WQ within the received range comprises applying at least one of: a voltage; and a current; and wherein adjusting the power to maintain the WQ near the received target within the range comprises adjusting at least one of: a voltage; and a current.

In another embodiment, a method determines a maintenance power, and applies the maintenance power when the EDI module is stopped to counteract the effects of back-diffusion. The technique also prevents applying an excessive current to the EDI module in order to preserve the longevity of the EDI module. This technique can be used when the system is occasionally placed in stand-by or idle mode.

Another embodiment includes controlling the water quality within a controllable range having a width less than or equal to about 5 MΩ·cm, and preferably less than or equal to about 2 MΩ·cm.

In an example arrangement, a system for producing purified water includes an EDI module, a controllable power supply electrically coupled to the electrodes in the EDI module, a power supply controller coupled to the controllable power supply, and a water quality sensor fluidly coupled to the purified water produced by the EDI module and coupled to the power supply controller. The power supply controller includes a processor, a processor memory, and computer-readable storage medium for tangibly storing thereon program logic for execution by the processor. The program logic includes logic for receiving a range and a target within the range for a water quality value of the purified water, receiving a water quality measurement (WQ) of the purified water from a water quality sensor, applying power to the EDI module to bring the WQ within the received range for the water quality and continuously adjusting the power to maintain the WQ near the received target within the range for water quality. Such a system provides lower power consumption, reduced water heating, reduced formation of precipitates thus longer lifetime of the EDI module and less formation of gases by electrolysis. In this arrangement, the power supply controller can be a derivative controller and the controllable power supply can be a controllable current power supply.

In a further embodiment, the system has a controllable range for the water quality having a width less than or equal to about 5 MΩ·cm, and preferably less than or equal to about 2 MΩ·cm. In a further embodiment, the power supply controller is a derivative controller and the controllable power supply is a controllable current power supply.

A computer-readable storage medium for tangibly storing thereon computer readable instructions for a method includes instructions for receiving a range and a target for a water quality value of the purified water, instructions for receiving a water quality measurement (WQ) from a water quality sensor, instructions for applying power to the EDI module to bring the WQ within the received range, and instructions for continuously adjusting the power to maintain the WQ near the received target for water quality.

BRIEF DESCRIPTION OF THE DRAWINGS

The accompanying drawings, which are incorporated in and form a part of the specification, illustrate the embodiments of the present disclosure and together with the written description serve to explain the principles, characteristics, and features of the disclosure. The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention. In the drawings.

DETAILED DESCRIPTION

The water quality ("WQ") of high purity water is commonly measured by its resistivity, a property of the water and typically measured in units of MΩ·cm. Embodiments of the presently described method and apparatus for operating an electro-deionization (EDI) module produce purified water with a system including a power supply controller, a WQ sensor and a controllable power supply to provide more efficient and reliable operation.

As used herein, the term "quality", "water quality" and its abbreviation "WQ" will be used interchangeably to signify the resistivity of the high purity water produced by the EDI module, typically measured in units of mega-ohms-centimeters (MΩ·cm). The higher the resistivity of the water is, the lower the concentration of ionic contaminants and the higher the water quality will be. The maximum achievable WQ of water is 18.2 MΩ·cm owing to the ionization of water into the ionic species $H^+$ and $OH^-$ according to the chemical reaction

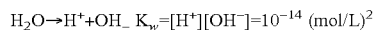

$$H_2O \rightarrow H^+ + OH^- \quad K_w = [H^+][OH^-] = 10^{-14} \, (mol/L)^2$$

EDI systems for the production of high purity water in laboratories are capable of routinely delivering WQ between 1~18 MΩ·cm, which has become the standard for general-purpose high purity water in laboratories. Alternatively, the water quality can be measured with the conductivity of the water, which is the inverse of resistivity, typically measured in units of nano-siemens per centimeter (nS/cm), in which case the lower the conductivity the lower the water quality.

Figure 1:
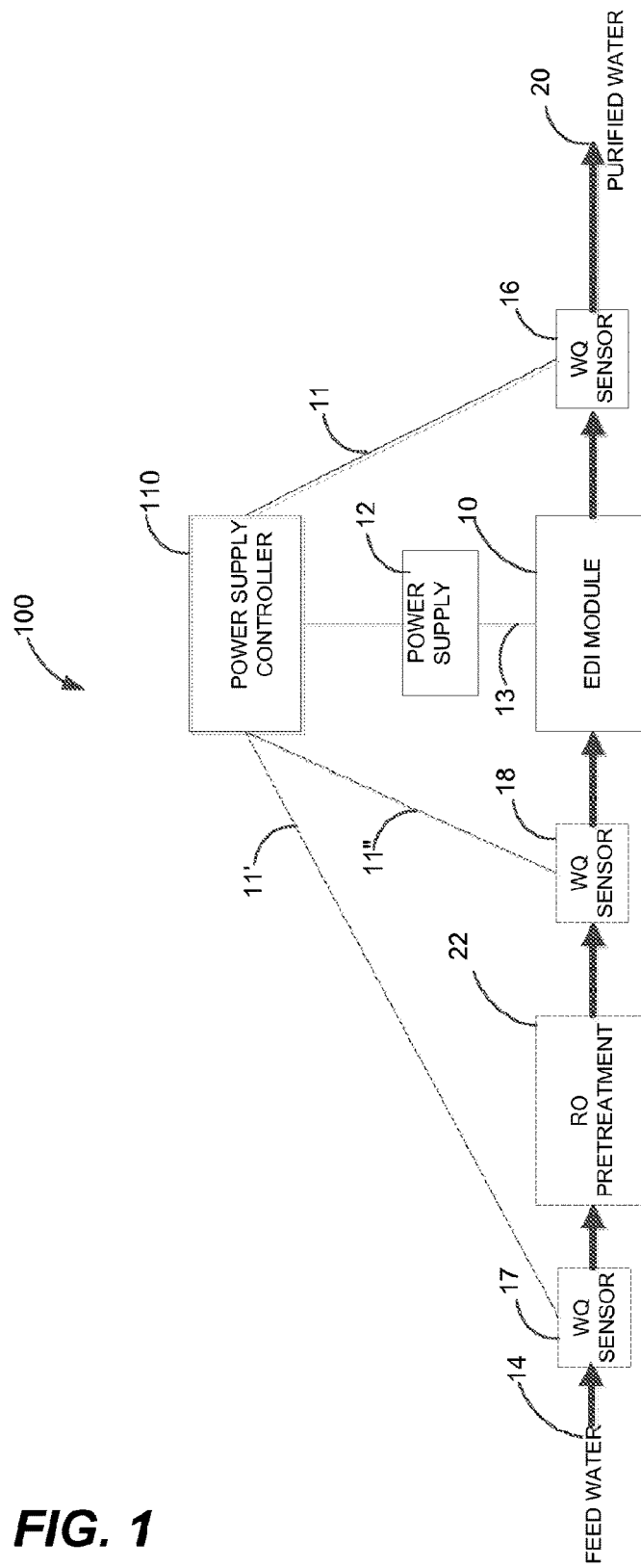
FIG. 1 is a schematic diagram of a system for producing purified water as disclosed herein.

Now referring to FIG. 1, a water purification system 100 includes a power supply controller 110 coupled to a power supply 12, which provides power to an EDI module 10. The power supply controller 110 is coupled to a water quality (WQ) sensor 16, which measures the water quality at the output of the EDI module 10, which produces purified water 20. The power supply controller 110 can also be coupled to optional WQ sensors 17 and 18 which measure the water quality of feed water 14 and the output of an optional reverse osmosis (RO) pretreatment module 22, respectively. The WQ sensors 16, 17 and 18 are collectively referred to as WQ sensors 16. The power supply 12 may be either a variable voltage or a variable current power supply. In one embodiment the power supply is a variable current power supply in order to provide more reliable control.

In operation, the power supply controller 110 controls the power supply 12 to apply power to the EDI module 10. The power supply controller receives the WQ of the purified water 11 from WQ sensor 16, and optionally the measured WQ 11' and 11" from sensors 17 and 18, and delivers current 13 to EDI module 10. Based on the WQ measurements, 11, 11' and 11" and using knowledge of the state of the EDI module 10 the power supply controller 110 instructs the power supply 12 to deliver a certain amount of power 13 to EDI module 10 according to a detailed control program of the power supply controller 110. In some embodiments, the power supply 12 can deliver only a non-zero positive minimum current and this current value and a maximum current value are used in determining a transfer function used to calculate the power supplied to the EDI module 10 to reach a user specified target water quality.

In conventional EDI processes, feed water is initially pretreated in a RO step to reduce the ionic load and colloidal contaminants prior to being directed to the EDI module 10. This practice reduces the ionic load on the EDI module 10 as well as extending its life by removing contaminants that bind strongly and irreversibly to the ion-exchange resins and membranes contained within the EDI module 10. However, even with RO pretreatment, the ionic load on an EDI module varies greatly depending on the ionic load of the tap water (the feed water to the water purification system) and the removal effectiveness of the RO pretreatment step. Therefore, to control the WQ of the purified water produced by the EDI module 10 to within a certain range, the EDI modules have to operate with ionic loads having a dynamic range as high as a hundred-fold.

Many laboratory water purification systems feed the high purity water to a tank, with end-users withdrawing water from the tank. When the tank is full the system stops, then restarting when the tank reaches a certain level (e.g. 50% of the maximum). Furthermore, many laboratories do not operate at night, or during the weekends, which means that the water purification system may be idle for extended periods of time. This intermittent operation disturbs the state of the EDI module 10 such that upon restarting it may not immediately produce the same WQ that the system was producing before it was stopped.

An ionic load to the EDI module 10 depends on the feed water to the water purification system (e.g., tap water) and the performance of the RO pretreatment step, both of which vary over time. The ionic load of feed water may vary seasonally, in which case it varies gradually in a time-scale measured in months as the seasons change, oscillating with a period of one year. The ionic load may also vary abruptly if the water source changes, for example, from a surface reservoir to a well. The performance of the RO pretreatment system also changes with time, first as a result of decreased flux between cleaning cycles producing an oscillatory change with a time cycle given by the interval of time between cleaning cycles, and secondly as a result of aging of the RO membrane/module that typically leads to decreased retention, producing a monotonic increase in ionic load to the EDI module 10 over the life of the RO module, typically 1 to 3 years. As a result, even with an unchanging feed water quality, the ionic load to the EDI module 10 is not constant, varying over time in an uncontrolled manner. Finally, the removal effectiveness of an EDI module itself also changes as it ages, becoming less effective the older it gets; this means that even with a fixed ionic load to the EDI module 10, as the module ages it may require a higher current. These factors are referred to as the purification factors of the water purification system, which represent the most relevant factors that determine the ionic load to the EDI module 10.

The baseline current is the current that, at equilibrium, delivers purified water at a specified target water quality. The baseline current is a function of the ionic load to the EDI module 10, the inherent (design) capacity of the EDI module 10, and how well the EDI module 10 performs. As such, the baseline current is a characteristic of each particular water purification system and its location, and therefore, it is a characteristic of each individual installation. However, due to the changing nature of the purification factors, the baseline current may change over time either in an oscillatory manner or monotonically increasing or decreasing gradually over time. Of course, the time scales for these changes depend on the time scale of the change in each purification factor, but in virtually all cases the time scale for getting a module equilibrated or nearly equilibrated and producing the target water quality (which takes hours to days) is smaller than the time scale induced by changes in the purification factors, which is measured in weeks to months to years. In summary, the changes in the purification factors occur either in an oscillatory manner around a certain mean, for example, due to the cleaning of the RO module or seasonal changes, or monotonically increasing due to decay in the effective rejection of the RO module or the deterioration of the EDI module 10.

Therefore, the baseline current to produce a target water quality from the EDI module 10 has a tendency to change over time in an unknown and uncontrolled manner, having an oscillatory component as well as a gradual monotonically increasing component over time. Accordingly, water purification system 100 requires a means of constantly adjusting the baseline current in response to changes in the purification factors in order to maintain a constant, or nearly constant, WQ as specified by the target water quality.

Figure 2:
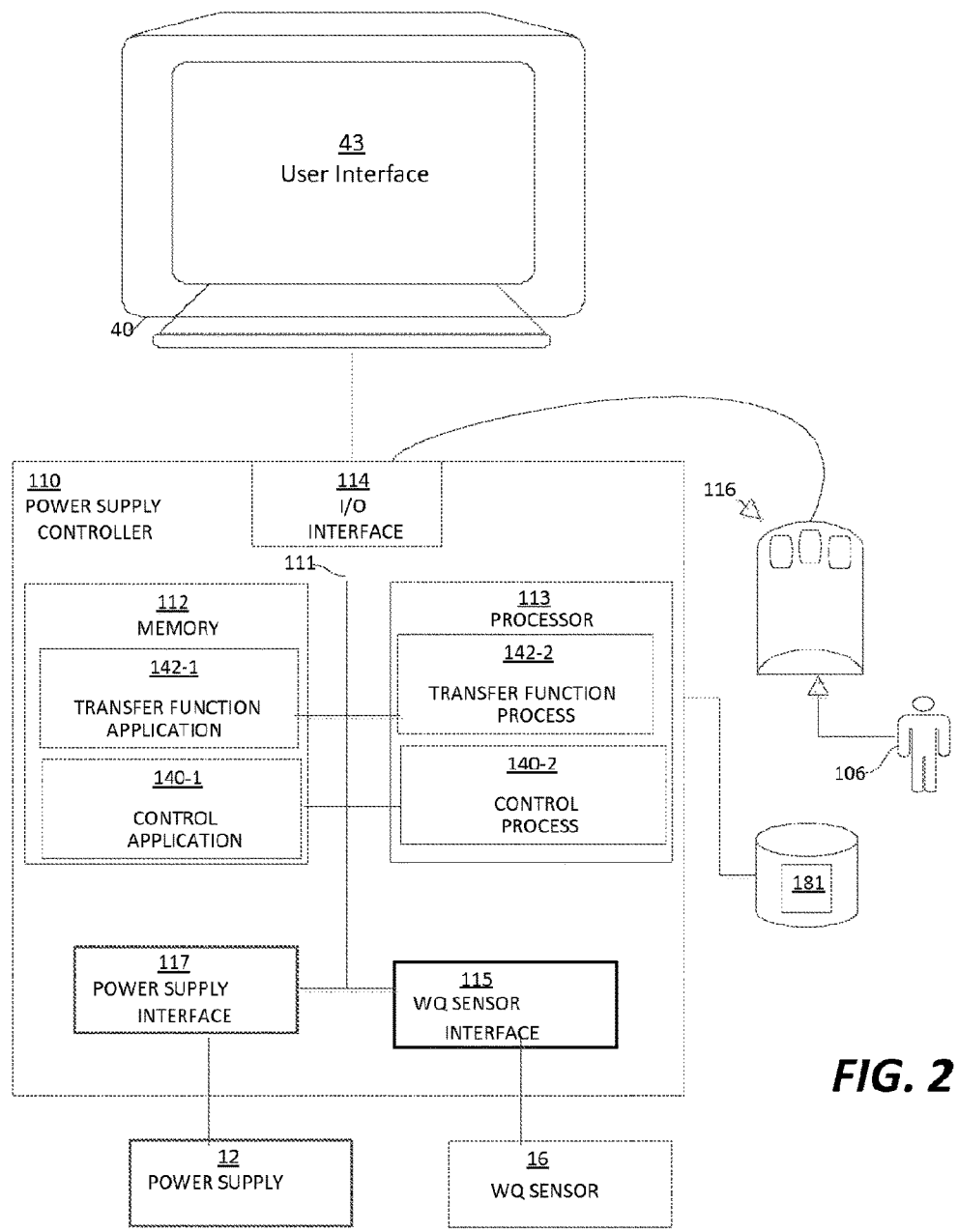
FIG. 2 shows details of the power supply controller of FIG. 1.

FIG. 2 is an exemplary block diagram illustrating an architecture of a power supply controller 110 that executes a control process 140-2 (e.g. an executing version of a control application 140-1) and a transfer function process 142-2 (e.g. an executing version of a transfer function 142-1) as controlled or configured by user 106 according to embodiments herein.

Note that the power supply controller 110 may be any type of computerized device such as a personal computer, a client computer system, workstation, portable computing device, console, laptop, network terminal, embedded processor, etc. This list is not exhaustive and is provided as an example of different possible embodiments. In addition to a single computer embodiment, power supply controller system 110 can include any number of computer systems in a network environment to carry the embodiments as described herein. Thus, those skilled in the art will understand that the power supply controller 110 can include other processes and/or software and hardware components, such as an operating system that controls allocation and use of hardware resources, or multiple processors.

As shown in the present example, the power supply controller 110 includes an interconnection mechanism 111 such as a data bus, motherboard or other circuitry that couples a memory system 112, a processor 113, an input/output interface 114, and a display 40. Data repository 181 can optionally be used for storing information relating to the operation of the EDI module 10. If so configured, the display 40 can be used to present a user interface 43 of the power supply controller 110 to user 106. An input device 116 (e.g., one or more user/developer controlled devices such as a keyboard, mouse, touch pad, touch sensitive screen, devices without keypads, speech input etc.) couples to the power supply controller 110 and processor 113 through the input/output interface 114. The power supply controller 110 can be a client system and/or a server system. As mentioned above, depending on the embodiment, the control application 140-1 and/or the control process 140-2 can be distributed and executed in multiple nodes in a computer network environment, executed as a web application or performed locally on a single computer.

During operation of the power supply controller 110, the processor 113 accesses the memory system 112 via the interconnect mechanism 111 in order to launch, run, execute, interpret or otherwise perform the logic instructions of the transfer function application 142-1. Execution of the control application 140-1 and the transfer function application 142-1 in this manner produces the control process 140-2 and the transfer function process 142-2. In other words, the transfer function process 142-2 represents one or more portions or runtime instances of the transfer function application 142-1 (or the entire transfer function application 142-1) performing or executing within or upon the processor 113 in the power supply controller 110 at runtime.

The control application 140-1 and transfer function application 142-1 may be stored on a computer readable medium, hard disk, and electronic, magnetic, optical, or other computer readable medium. It is understood that embodiments and techniques discussed herein are well suited for other applications as well. Those skilled in the art will understand that the power supply controller 110 may include other processes and/or software and hardware components, such as an operating system. Display 40 need not be coupled directly to power supply controller 110. For example, the control application 140-1 and transfer function application 142-1 can be executed on a remotely accessible computerized device via a communication interface (not shown). The display 40 presents a user interface 43 that displays information related to the operation of the EDI module 10 and allows the user 106 to provide a desired range and target for water quality of the purified water 20. The control application 140 controls the power supply 12 through a power supply interface 117 in conjunction with the transfer function 142. The control application 140 also receives feedback from the WQ sensors 16 through a WQ sensor interface 115.

Note that the following discussion provides a basic embodiment indicating how to carry out functionality associated with the control application 140-1 (also referred to as power supply control 140) and transfer function application 142-1 (also referred to as transfer function 142) as discussed above and below. However, it should be noted that the actual configuration for carrying out the power supply control 140 and transfer function 142 could vary depending on a respective application.

Figure 3A:
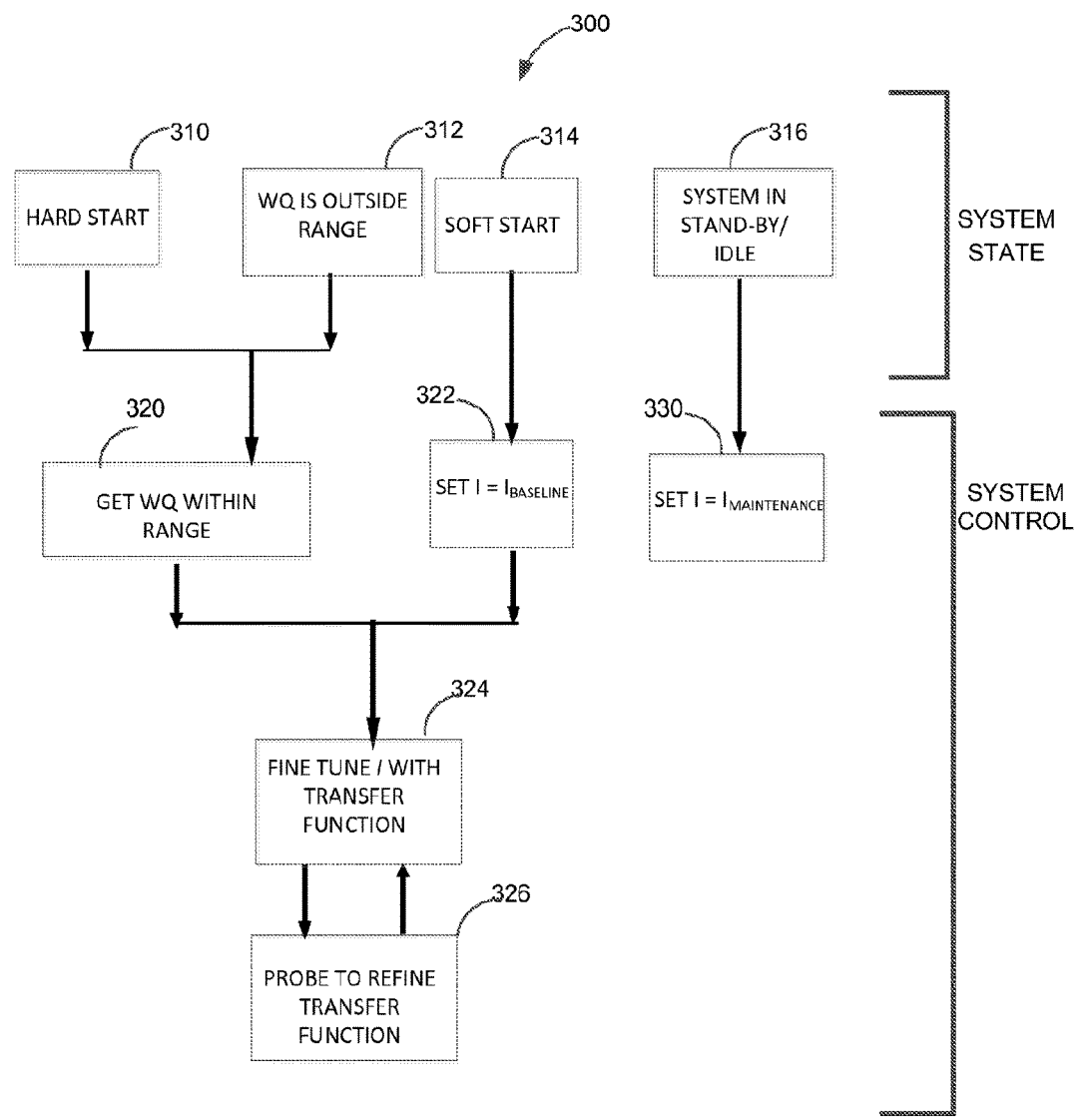
FIG. 3A is a schematic diagram of the system state and system control of the control system according to embodiments disclosed herein.

Now referring to FIG. 3A, a block diagram 300 provides an overview of the operation of the power supply controller 110 and the EDI module 10. The water purification system 100 can begin operation in one of several system states. These system states are related to states of the EDI module 10, which are determined by the degree of regeneration of the ion-exchange resin within the EDI module 10. EDI modules have resin-filled channels capable of having a significant capacity for removal of ions (ion-exchange capacity) even when no current is being applied to the module. When an EDI module produces a constant (or nearly constant) WQ at the baseline current, it is said to be equilibrated (or nearly equilibrated) with the feed stream. Such an EDI module has just the right amount of ion-exchange capacity appropriately distributed along the flow path of the purified water within the EDI module 10. Such a module is referred to as being in an "equilibrated (or nearly equilibrated) state." If the EDI module 10 has any less capacity the WQ of the purified water produced will be below the target water quality. If the EDI module 10 has any greater capacity the WQ of the purified water produced will be above the target water quality.

Alternatively, an EDI module may have excess ion-exchange capacity in which case the module will deliver the target water quality with a current lower than the baseline current. In cases where the excess capacity is very high, the EDI module 10 will deliver WQ above the specified range for the water quality even with low or no current. Such a module is referred as one being in an "over-regenerated state." Finally, a module may have insufficient ion-exchange capacity in which case the module will not be able to deliver water in the specified range for the water quality even with a current higher than the baseline current. Such a module is referred to as one being in an "under-regenerated state."

For the water purification system 100 to deliver the target water quality, the water purification system 100 has to get the EDI module 10 to or near a state of equilibrium. Once the EDI module 10 is in or near an equilibrated state, the power supply controller 110 adjusts the baseline current to ensure that the EDI module 10 remains in that state. However, when the EDI module 10 is brand new, or when the EDI module 10 has been idle for a long time, or when one of the purification factors changes abruptly, the EDI module 10 will no longer be in or near an equilibrated state and will not be able to deliver a constant WQ at the target water quality. To restore the EDI module 10 to a state of equilibrium, the power supply controller 110 must supply a current that is lower or higher than the baseline current depending on the module being in an over-regenerated or under-regenerated state, respectively. To do this, the power supply controller 110 adjusts the power to the EDI module 10 either to a minimum or a maximum power to rapidly restore the EDI module 10 to a state that is close to the state of equilibrium. To do so, the power supply controller 110 needs to know the state of the EDI module 10 either as a result of measurements made by the system or as a result of it having been specified by the user.

Referring again to FIG. 3A, the system states are either detected by the power supply controller 110, saved to and retrieved from the data repository 181 or can be specified by the user 106. Exemplary system states include a "hard start" state 310 which, for example, could be due to the installation of a new water purification system or the replacement of an EDI module 10 with a brand new EDI module. A second exemplary system state is "WQ is outside range" state 312, which indicates that the WQ is outside a range for the water quality selected by the user 106. Still another exemplary system state is "soft start" state 314, which indicates that the system is restarting or starting with the EDI module 10 in an equilibrated or near equilibrated state and with a saved baseline current, $I_{Baseline}$. Another system state is a "standby" or "idle" state 316 described below in more detail in conjunction with FIG. 7.

When the water purification system 100 is started for the first time or when the EDI module 10 is replaced with a brand new EDI module, the system is in hard start state 310. When in this state, the power supply controller 110 does not have a known value for the baseline current. Furthermore, the power supply controller 110 does not know the state of the EDI module 10. In one embodiment, the user 106 can indicate that a new EDI module 10 has been installed. From either a hard start state 310 or when the WQ is outside the selected range for water quality, state 312, the power supply controller 110 attempts to restore the WQ to within the specified range of water quality as shown in process control block 320.

In contrast, whenever the system is in a soft start state 314, the power supply controller 110 sets the current to the previously saved baseline current in process block 322. Normal operation of the module is shown in process blocks 324 and 326, which attempt to maintain the WQ at a target water quality value specified by the user 106. Details of these control operations are described below in conjunction with flow diagrams in FIGS. 4-7.

The water purification system 100 may also be in Standby or Idle state 316. This is a common situation in laboratory water purification systems and occurs when the high purity water tank is full. The idle periods may occur during the day, in which case may last a few minutes to a few hours, may happen overnight when the laboratory is not being used, in which case the idle period lasts twelve to eighteen hours, and may happen over weekends or periods when the whole laboratory is shut down, in which case the idle period lasts several days to a few weeks. During these idle periods the ions in the resin within the concentrating compartment of the EDI module 10 diffuse to the resin within the diluting compartment by virtue of their high concentration in the concentrating compartment. This process of "back diffusion" consumes some of the ion-exchange capacity of the diluting compartment and disturbs the equilibrated state of the module, inducing the module to become under-regenerated. If the idle period is short, the disturbance from an equilibrated state will be small, possibly imperceptible. However, if the idle period is long enough the disturbance induced by back-diffusion is significant enough such that when the module is restarted with the baseline current, $I_{Baseline}$, in process block 322 it does not rapidly produce WQ near the specified range for the water quality. It has been discovered that a small level of power applied to the EDI module 10 during the idle period prevents or ameliorates the effects of back-diffusion, enabling the module to deliver WQ shortly after being restarted with the baseline current. This maintenance level of power and corresponding maintenance current is lower than the baseline level of power required by the EDI module 10 (i.e., the power required to deliver the baseline current and in turn to deliver the target water quality). The maintenance current is possibly 10 to 1000 times lower than the baseline current, and in some embodiments the voltage should be lower than the decomposition voltage of water at the electrodes. The maintenance power can be in the form of a constant current or voltage, or a variable current or voltage. Furthermore, when power is applied to the EDI module 10, gas is generated at the electrode compartments due to the electrochemical reactions that occur at the electrodes. As a result, it may sometimes be necessary to flush the module with feed water by running the water purification system momentarily to remove the accumulated gas from the electrode compartments. Alternatively, the EDI module 10 may be flushed with stored purified water.

In one embodiment the maintenance power is controlled at 1 to 5 volts. In other embodiments it is controlled at 1 to 20 µA. The level of maintenance power necessary to counteract the effects of back-diffusion depends on the size of the module, including the number of cells of the EDI module 10. For example, the larger the number of cells the larger the maintenance voltage; the larger the cross sectional area of a cell, the larger the maintenance current. The power level can be determined experimentally for each module. Alternatively, this power level may be calculated based on the diffusion properties of the ions and the physical properties of the EDI module 10. Likewise, the flow rate and interval of flushing cycles to prevent the accumulation of gas during the application of the maintenance power may be determined experimentally for each EDI module or calculated based on the physical properties of the module and knowledge of the electrochemical reactions taking place at the electrode.

Figure 3B:
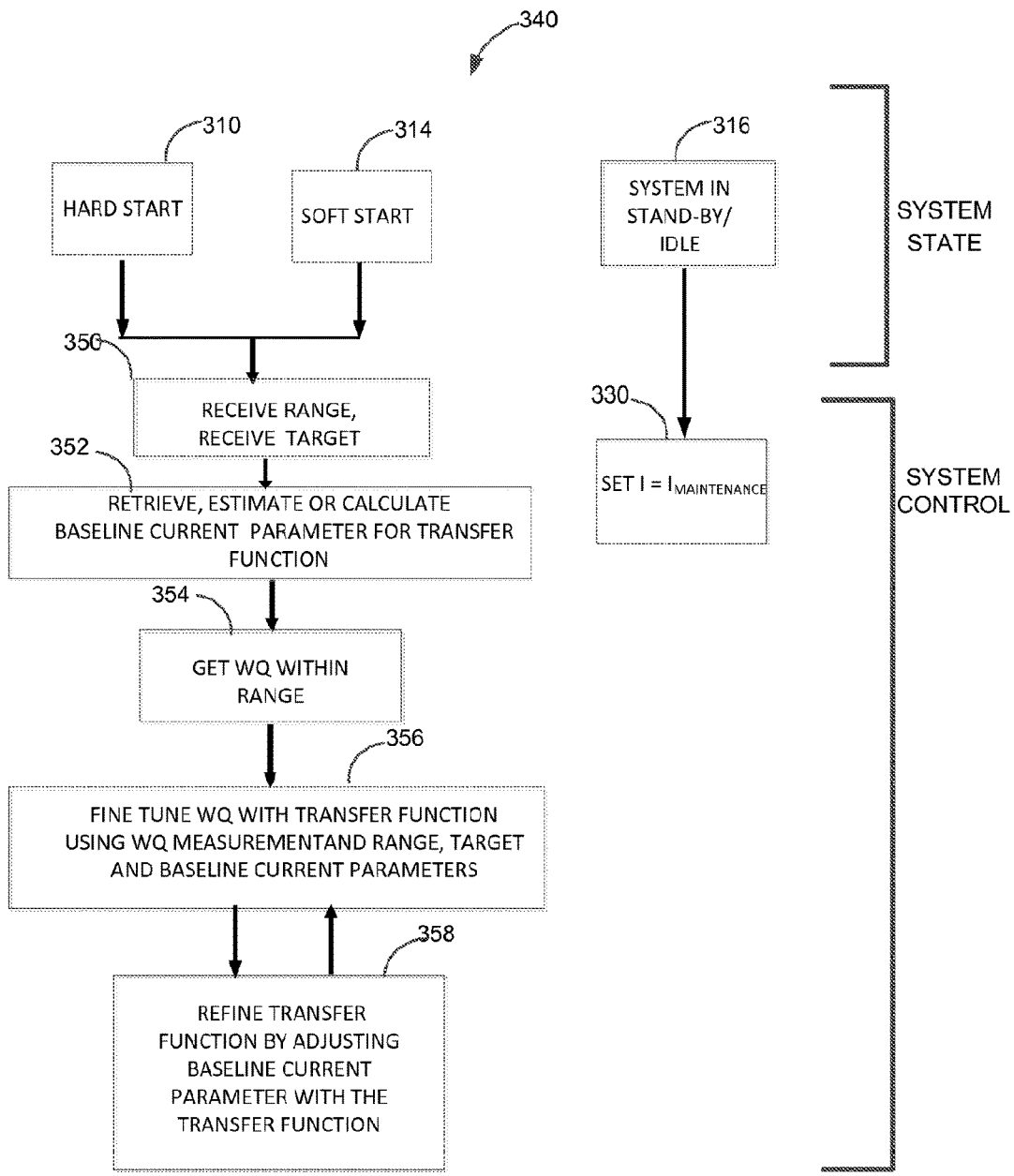
FIG. 3B is a schematic diagram of the system state and system control of the control system according to another embodiment disclosed herein.

Now referring to FIG. 3B, a block diagram 340 provides an overview of the operation of the power supply controller 110 and the EDI module 10 in another embodiment. Block diagram 340 shows an alternate embodiment of the operation of the power supply controller 110 and the EDI module 10. This embodiment simplifies the system states of FIG. 3A by eliminating the WQ OUTSIDE RANGE state. Block diagram 340 includes further details of the transfer function and the use of the baseline current parameter including using the transfer function to adjust the baseline current parameter.

When the water purification system 100 is started for the first time or when the EDI module 10 is replaced with a brand new EDI module, the system is in hard start state 310. When in this state, the power supply controller 110 does not have a value for the baseline current. Furthermore, the power supply controller 110 does not know the state of the EDI module 10. Alternatively, the water purification system 100 may be started from soft start state 314, the state of the EDI system after being in stand-by state 316. In that case, the water purification system 100 has an estimated value of the baseline current from the last run.

As described earlier, at any point in time the baseline current is a property of the water purification system. It should be understood that the water purification system 100 does not know a priori the value of the baseline current. The baseline current may be estimated by one of the methods described earlier, including by measuring the ionic load of the feedwater and calculating a baseline current using a predetermined formula. Regardless of how the baseline current is estimated, some embodiments of this invention require an estimate of the baseline current to determine the current supplied to the EDI module 10. The estimated value of the baseline current will be referred hereafter as the baseline current parameter to distinguish it from the (true) baseline current. It should be further understood that the baseline current parameter may, or may not be a good estimate of the baseline current. Regardless of being a good or a poor estimate, in some embodiments the baseline current parameter is used by the water purification system to control the current supplied to the EDI module 10. In those embodiments it may be advantageous for the controller to refine the estimate of the baseline current by adjusting the baseline current parameter. This is described in more detail below.

As shown in FIG. 3B, regardless of the system being in a hard start state 310 or a soft start state 314, the first step of the power supply controller is to receive the range and the target as shown in process control block 350. These parameters along with other inputs determine the operation of the power supply controller 110. The baseline current parameter is retrieved, estimated or calculated depending on the state of the system as described above in process block 352. Whenever the system starts from a soft start state 314, the baseline current parameter has been determined/calculated from the last run. The range and the target are entered by the user, and therefore, are values received by the controller. It is understood that the received range can be calculated as either predetermined limits or user set limits around the received target.

In the next step the power supply controller 110 attempts to restore the water quality to within the specified range of water quality as shown in process control block 354. Depending on the state of the EDI module 10 the water quality will be either above or below the range. In this step the power supply controller supplies either the maximum or the minimum current to get the water quality within the range as rapidly as possible. If the water quality is below the range, the power supply controller supplies the maximum current; if the water quality is above the range, the power supply controller supplies the minimum current.

Once the water quality is within the range, the power supply controller 110 fine tunes the water quality by modulating the current supplied to the EDI module 10 as shown in process control block 356. In one embodiment, fine tuning indicates the process of adjusting the WQ closer to the target. Fine tuning of the water quality utilizes a transfer function that determines the current that should be applied by power supply 12 based on the measured water quality, which, in one embodiment, depends on at least three parameters: the baseline current, the range and the target, with the objective of getting the water quality as close as possible to the target.

The ability of the transfer function to fine-tune the water quality close to the target depends on how close the baseline current parameter is to the baseline current. As explained above, the baseline current is the current that enables the production of water at the target water quality when the EDI module 10 is at or near an equilibrated state, which is a function of the purification factors, and as such, changes with time and with the feedwater quality. To approach the target, the baseline current parameter may need to be adjusted to approach a value closer to the baseline current, in process control block 358. In this embodiment, as indicated in process control block 358, the system 100 utilizes the transfer function to adjust the baseline current parameter to approach the baseline current, and hence to get the water quality closer to the target. This may be done by means of a probing cycle, wherein a step change in current (e.g., a probing current) is effected with a measurement of the consequent change in the water quality, from which the controller calculates the rate of change of water quality with current, enabling it to adjust the baseline current parameter to get the water quality closer to the target. A probing cycle is effectively performed when the system is equilibrated or nearly-equilibrated, and represents one way of adjusting the baseline current parameter to refine the transfer function and get the water quality closer to the target. There are other methods of adjusting the baseline current parameter when the EDI module 10 is in an equilibrated or near-equilibrated state including, making sequential pre-determined step changes in the baseline current parameter whose sign (positive or negative) are determined by the measured water quality being above or below the target, and each step change being smaller in absolute value than the previous one. It may also be possible to adjust the baseline current parameter even if the module is not yet in a near-equilibrated state, including making a predetermined step change in baseline current parameter and following the consequent change in water quality as a function of time, followed by fitting an appropriate mathematical function to the water quality vs. time response, thereby projecting the equilibrium water quality and enabling the determination of the rate of change of the equilibrated water quality with respect to supplied current even without allowing the EDI module 10 to reach a near-equilibrated state. An important concept in this embodiment is the adjustment of the baseline current parameter to enable the transfer function to get the water quality closer to the target.

Functionality supported by the power supply controller 110 and, more particularly, functionality associated with control application 140 and transfer application 142 will now be discussed via flowcharts in FIGS. 4-7. For purposes of the following discussion, flow diagrams of particular embodiments of the presently disclosed methods are depicted in FIGS. 4-7. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 4:
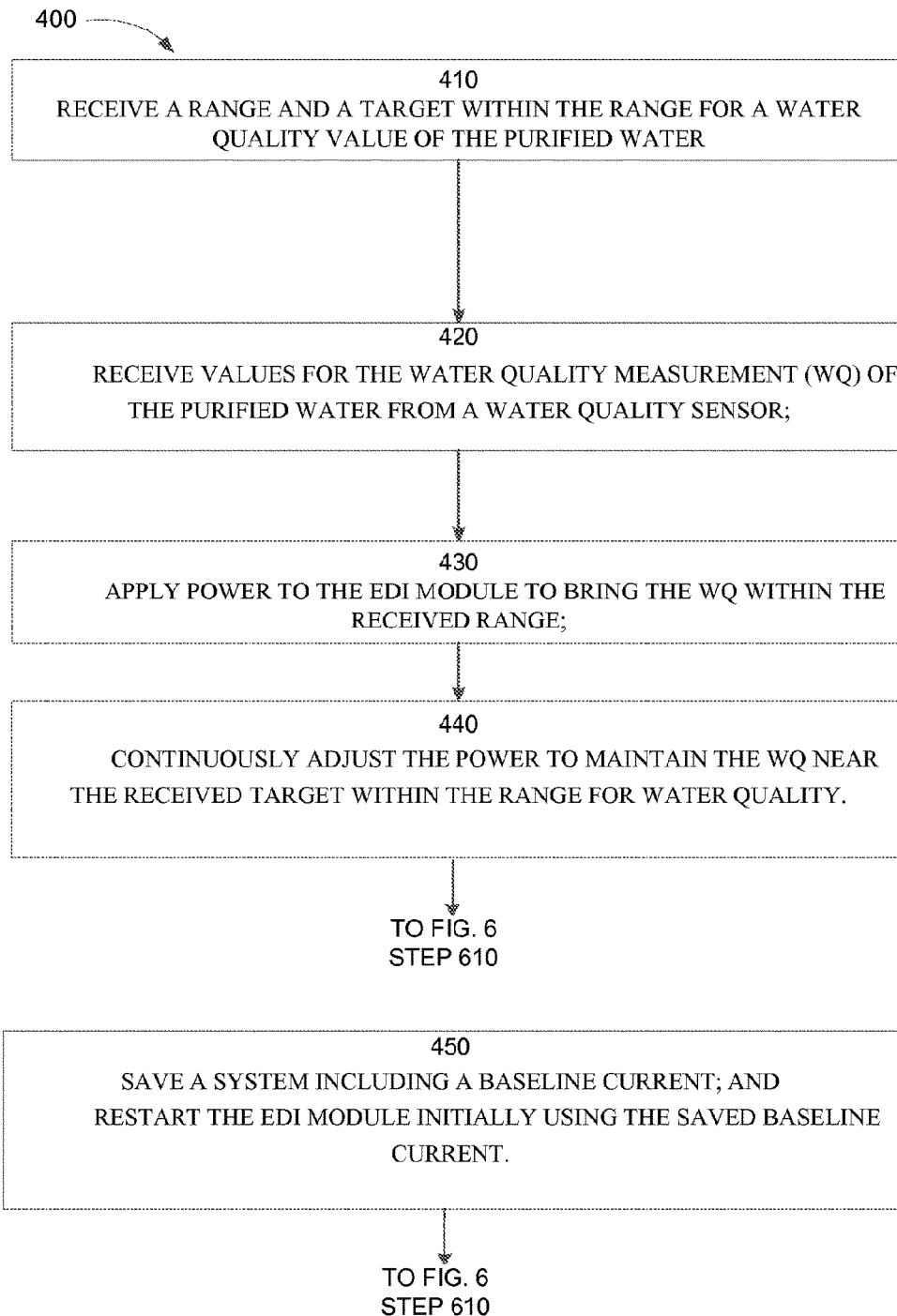
FIGS. 4-7 are flowcharts illustrating example processes according to embodiments herein.

Referring now to FIG. 4, a method 400 of operating an EDI module to produce purified water is shown. In the following description, it is understood that power can be applied to the EDI module 10 using a power supply with adjustable voltage, adjustable current or using a power supply having both adjustable voltage and current. Method 400 begins with processing block 410, which discloses receiving a range and a target water quality value of the purified water. In one embodiment, the user 106 can enter values for the range and the target water quality using the user interface 43 and a keyboard, mouse or other input devices. In another embodiment the range is preset at the factory into the power supply controller 110 memory 112. The water purification system 100 has a controllable range for the water quality value. In one embodiment, the system has a controllable range width of less than 5 MΩ·cm. In another embodiment, the system has a controllable range width of less than 2 MΩ·cm. The smaller the width of the controllable range means finer control of the output water quality.

The smallest range which can be controlled depends on the response time of the EDI module 10 to changes in current. This controllable range width may be selected experimentally based on how fast the EDI module 10 reaches equilibrium or close to equilibrium and the granularity of control by the power supply controller 110. In certain embodiments a controllable range width of less than 5 MΩ·cm is desirable. In other embodiments a controllable range width of less than about 2 MΩ·cm is desirable. In still other embodiments a controllable range of less than about 1 MΩ·cm is desirable.

The received range (specified by the user 106) for the water quality value of the purified water comprises a lower bound and an upper bound for the water quality, and the difference between the upper bound and the lower bound is called a width of the received range. The width of the received range for the water quality should be greater than or equal to the width of the controllable range of the water purification system 100. The received target (specified by the user 106) for water quality is a value within the received range for the water quality. For example, if the received range is specified as 10 to 12 MΩ·cm, a target water quality may be, for example, any one of 10, 10.5, 11, 11.5, or 12 MΩ·cm. This received range corresponds to a width of the controllable range of 2 MΩ·cm. If the target water quality is not specified it is presumed to be at the middle of the received range, and more specifically, the average of the lower and upper bound of the range. For example, if a range of 10 to 15 MΩ·cm is specified and the target is not specified, then the target would be 12.5 MΩ·cm.

Alternatively, the received target water quality may be specified together with the half width of the received range. In this case the lower bound of the received range is equal to the target minus the half-width of the received range, with the upper bound of the received range equal to the target plus the half-width of the received range. It should be understood that the received range and received target for water quality can be specified directly or indirectly.

The importance of specifying both the range and the target for water quality lies on the discovery that control cycles to rapidly and effectively get the water quality of the EDI module 10 to be within the received range are different from those required to get the WQ to be at the received target. The control cycles to get the module to rapidly produce purified water within the received range require that high or low power be applied to the EDI module 10 until the water quality of the EDI module 10 is within the received range. In contrast, the control cycles to get the water quality of the EDI module 10 to be near to the received target for water quality require continuous adjustment of the power to the EDI module 10 and possibly fine tuning of the transfer function that adjusts, for example, the current based on the water quality measurement and in some embodiments, the purification factors.

At step 420, a water quality measurement (WQ) is received from a water quality sensor of the purified water (i.e. monitoring the purified water 20 produced from the EDI module 10). It is understood that additional optional WQ sensors 17 and 18 can provide measurements of the water quality of feed water 14 and the output of an optional reverse osmosis (RO) pretreatment module 22, respectively. The additional measurements of water quality upstream of pretreatment 11' and/or downstream of pretreatment 11" can be used to refine the transfer function 142 of the power supply controller 110. The transfer function determines the new power to be applied to the EDI module 10 based on the WQ measurement or measurements. In one embodiment using a controllable current power supply, a current to be applied is determined by the transfer function.

At step 430, power is applied to the EDI module 10 to bring the WQ within the received range of the water quality. Applying power to the EDI module 10 to bring the WQ within the received range for the water quality can include applying a voltage or a current. At step 440, power is continuously adjusted to maintain the WQ near the received target water quality. Adjusting the power to maintain the WQ near the received target can include adjusting a voltage or a current. In one embodiment using a controllable current power supply, the current is continuously adjusted, and the current that produces the target water quality is referred to as the baseline current. It is understood that the current can be continuously adjusted with either analog or digital control and that the time period between incremental changes can be varied.

In certain embodiments, the power supply 12 is a controllable DC power supply (i.e., capable of delivering different DC power levels as determined by the power supply controller 110). In general, there are two types of controllable power supplies, controllable voltage and controllable current power supplies. Controllable voltage power supplies deliver a voltage that is controlled by the power supply controller. Exemplary ranges of voltage for controllable power supplies used with the EDI module 10 are: 5 to 100 V; 10 to 180 V; 20 to 240 V; 60 to 600 V. Controllable current power supplies deliver a current that is controlled by the power supply controller 110. Exemplary ranges of current for controllable current supplies are: 5 to 80 mA; 10 to 120 mA; 1 to 120 mA; 1 to 10 A; 0.1 to 10 A. Both types of controllable power supplies can be used in conjunction with the power supply controller 110.

Since current is one physical parameter that drives the purification process in an EDI module, a controllable current power supply makes for a simpler and more responsive control. Of course, the same level of responsiveness and control is possible with a controllable voltage power supply when used in conjunction with an ammeter. In general, both controllable current and controllable voltage power supplies can be used.

A soft start operation using the saved system state including the baseline current restarts the EDI module 10 by applying the baseline current to the EDI module 10 at step 450. In one embodiment, the baseline current is optionally saved upon stopping the water purification system because, for example, the tank is full, leaving the system in a "standby" or "idle" mode. The soft start can occur at any time during the operation of the system 100. In general, the soft start state occurs when the system is stopped as a result of its normal operation. In contrast a hard start state occurs when the system is started as a result of a significant event not part of the normal operation of the water purification system, for example, when the system is installed for the first time; when the EDI module 10 is replaced; when an RO module is replaced; etc.

Figure 5:
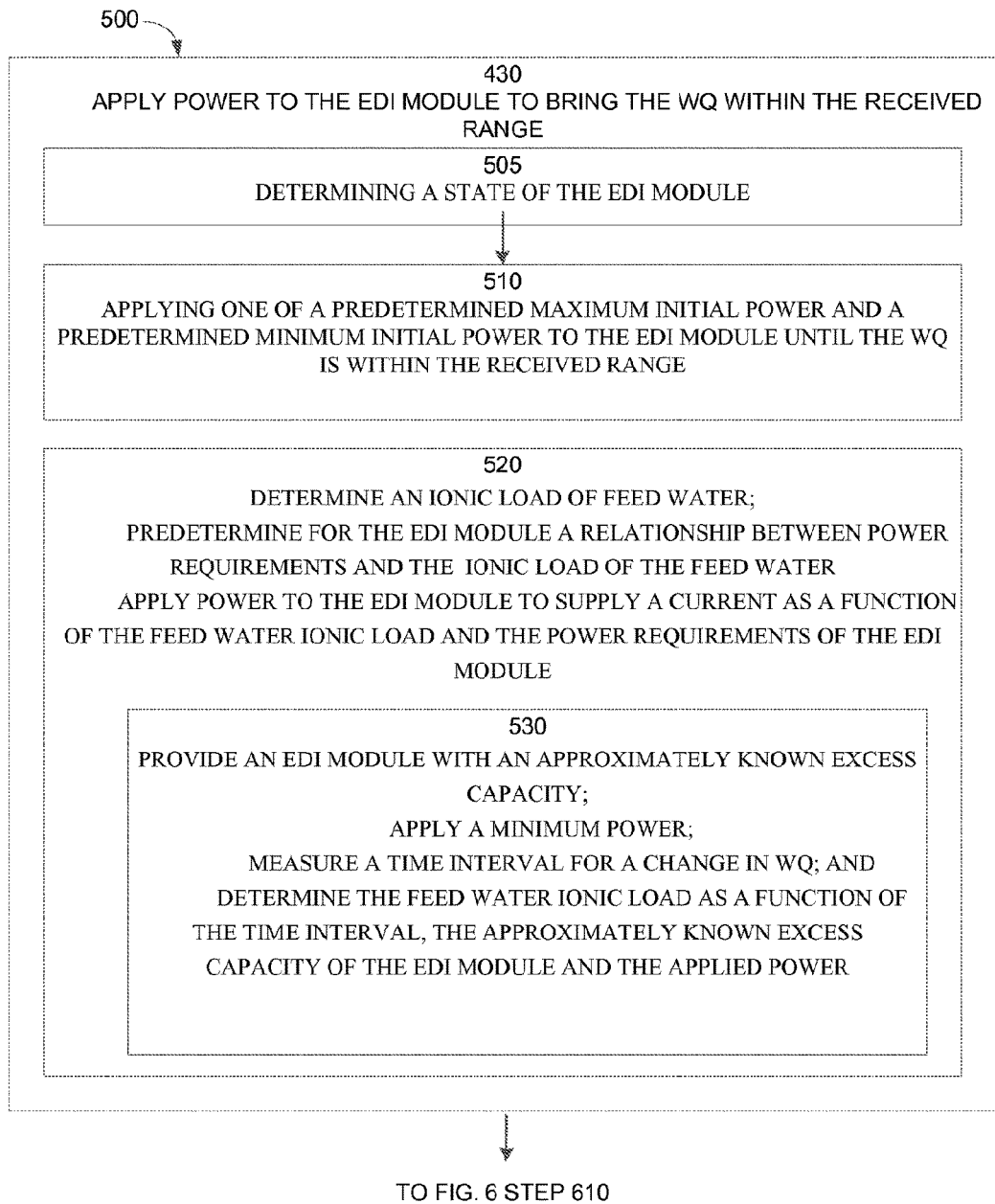

Now referring to FIG. 5, a flow diagram 500 details several options to handle the hard start operation of step 430. At step 505, the control system establishes the state of the EDI module 10 by running the EDI module 10 at a predetermined probing current for a certain predetermined time and measuring the WQ of the purified water 11. In one embodiment it determines that the module is in an over-regenerated state if the WQ measurement 11 exceeds the upper bound of the received range for the water quality; or that the module is in a nearly equilibrated state if the WQ measurement 11 is within the received range. At step 510, a predetermined maximum initial power is applied and a predetermined minimum initial power to the EDI module 10 until the WQ is within the received range.

At step 520, an ionic load of the feed water is determined. Knowing the ionic load of the feed water, an initial baseline current is determined by predetermining a relationship between power requirements of the EDI module 10 and the ionic load of the feed water, and applying power to the EDI module 10 to supply a calculated initial current. This predetermined relationship takes into account all of the purification factors of the water purification system, including a priori assumptions of the performance of the RO pretreatment and the EDI module 10 in order to optimize the estimate of the initial baseline current.

Step 530 details one way of determining the ionic load of the feed water by providing an EDI module with an approximately known excess capacity, applying a minimum power and measuring a time interval for a change in the WQ sensor 16 measuring the purified water 20, and predetermining a relationship between the ionic load of the feed water as a function of the time interval, the approximately known excess capacity of the EDI module 10 and the applied power. In one embodiment, the EDI module 10 is approximately in a fully regenerated state.

Step 520 describes another embodiment of a "hard start" state where an initial baseline current is estimated based on the ionic load of the feed water 14. According to this embodiment, an initial baseline current is determined based on a (predetermined) relationship between the ionic load of the water purification system 14 and the baseline current of the EDI module 10. This predetermined relationship takes into account all of the purification factors of the water purification system, including a priori assumptions of (a) the performance of the RO pretreatment, (b) the performance of the EDI module 10, and (c) the relationship between power from the power supply and current to the EDI module 10. Step 510 calculates an initial baseline current and power to the EDI module 10 by the power supply, and starts the water purification system with the power to the EDI module 10 set at this predetermined level. After a certain predetermined delay time, if the WQ is within the specified range of water quality, then the power supply controller 110 resumes operation at Step 320. Alternatively, if the WQ is outside the received range of the water quality, the system state transitions into the WQ is outside range state 312 and proceeds to Step 430 to bring the WQ within the received range.

Step 530 describes another embodiment of the "hard start" state 310 where an initial baseline current is estimated based on the ionic load to the EDI module 10. According to this embodiment, the ionic load to the EDI module 10 is determined based on a (predetermined) relationship between the known (predetermined) excess capacity of the EDI module 10, the current being used to drive the EDI module 10, and the time interval for consuming said excess capacity. Step 530 starts the system at a low power, lower than the anticipated power required to obtain the target WQ. Since the module is in an over-regenerated state, the WQ will be above the specified range of water quality. The power supply controller 110 proceeds to monitor the WQ of the purified water 11 until it changes, for example, to a value within the specified range of water quality, and measures the time interval for this change to occur. The power supply controller 110 then calculates an estimated baseline current and power to the EDI module 10, and proceeds to set the power to this level. In embodiments where the WQ is within the specified range of water quality, the system proceeds to Step 440 in FIG. 6.

Figure 6:
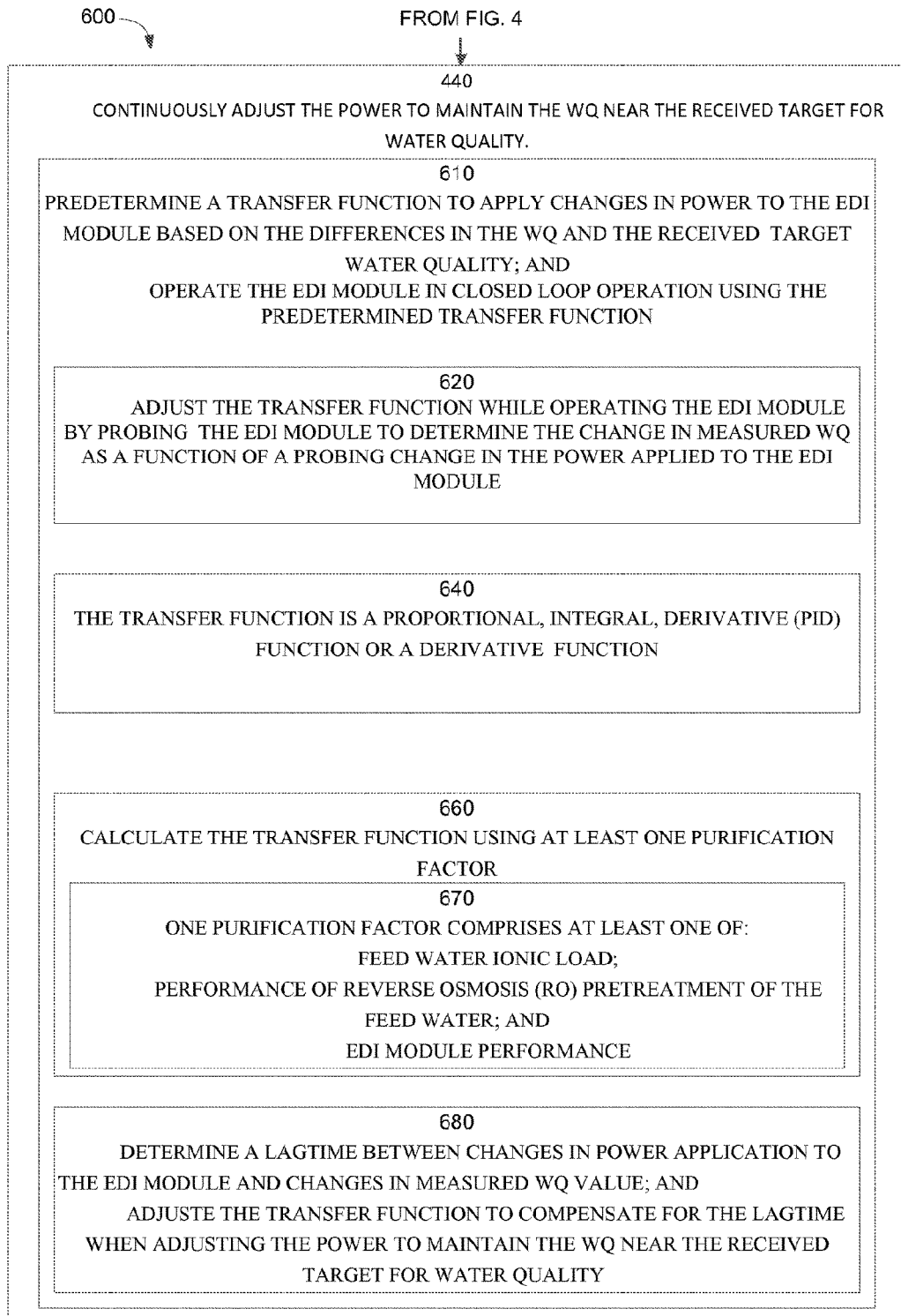

Now referring to FIG. 6, flow diagram 600 illustrates further details of the power supply controller 110 continuously adjusting the power to maintain the WQ near the received target water quality. At step 610 the control system predetermines a transfer function to apply changes in power to the EDI module 10 based on the measured WQ and the received target water quality and operating the EDI module 10 in closed loop operation using the predetermined transfer function. At step 620 the transfer function is adjusted while supplying power to the EDI module 10 by probing the EDI module 10 to determine the change in measured WQ as a function of a probing change in the power applied to the EDI module 10. At Step 640 it is disclosed that the transfer function is a Proportional, Integral, Derivative (PID) function or that the transfer function is a derivative function. Conventional systems generally use a proportional control system. Using a derivative function provides more accurate control of the power supply 12 to reach and maintain the target water quality.

At step 660 a transfer function is predetermined by calculating the transfer function using at least one purification factor. At 670 it is disclosed that the at least one purification factor includes at least one of: feed water ionic load, performance of reverse osmosis (RO) pretreatment of the feed water; and EDI module performance.

At step 680, a lag time between changes in power application to the EDI module 10 and changes in measured WQ value is determined or predetermined and the transfer function is adjusted to compensate for the lag time when adjusting the power to maintain the WQ near the received target water quality. Techniques to compensate for the lag time include, but are not limited to, deadbeat control, lag compensators and a Smith Predictor.

Figure 7:
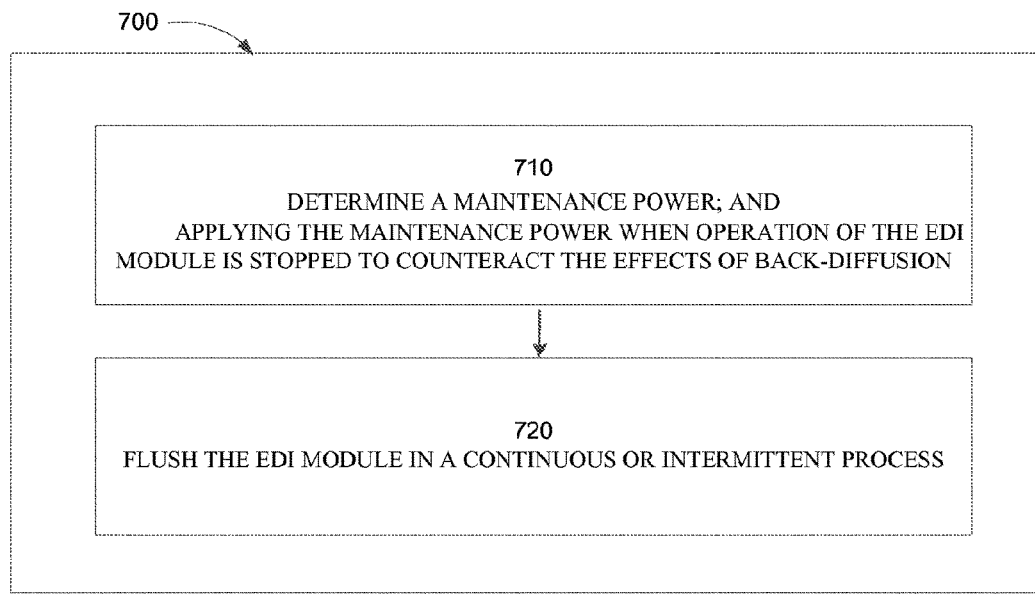

Now referring to FIG. 7, a flow diagram 700 details a step 710 in which a maintenance power is either predetermined or determined and then applied when the EDI module 10 is in a stand-by or idle state. The application of the maintenance power counteracts the effects of back-diffusion, which disturbs the equilibrium state of the EDI module 10 as described above. Step 720 describes the flushing of the module, which may be necessitated if gas accumulation is excessive and impacts the effective application of the maintenance power. In this case, the control system induces either a low flow, or a high intermittent flow based. The flush cycle may be predetermined or determined by the control system.

Figure 8:
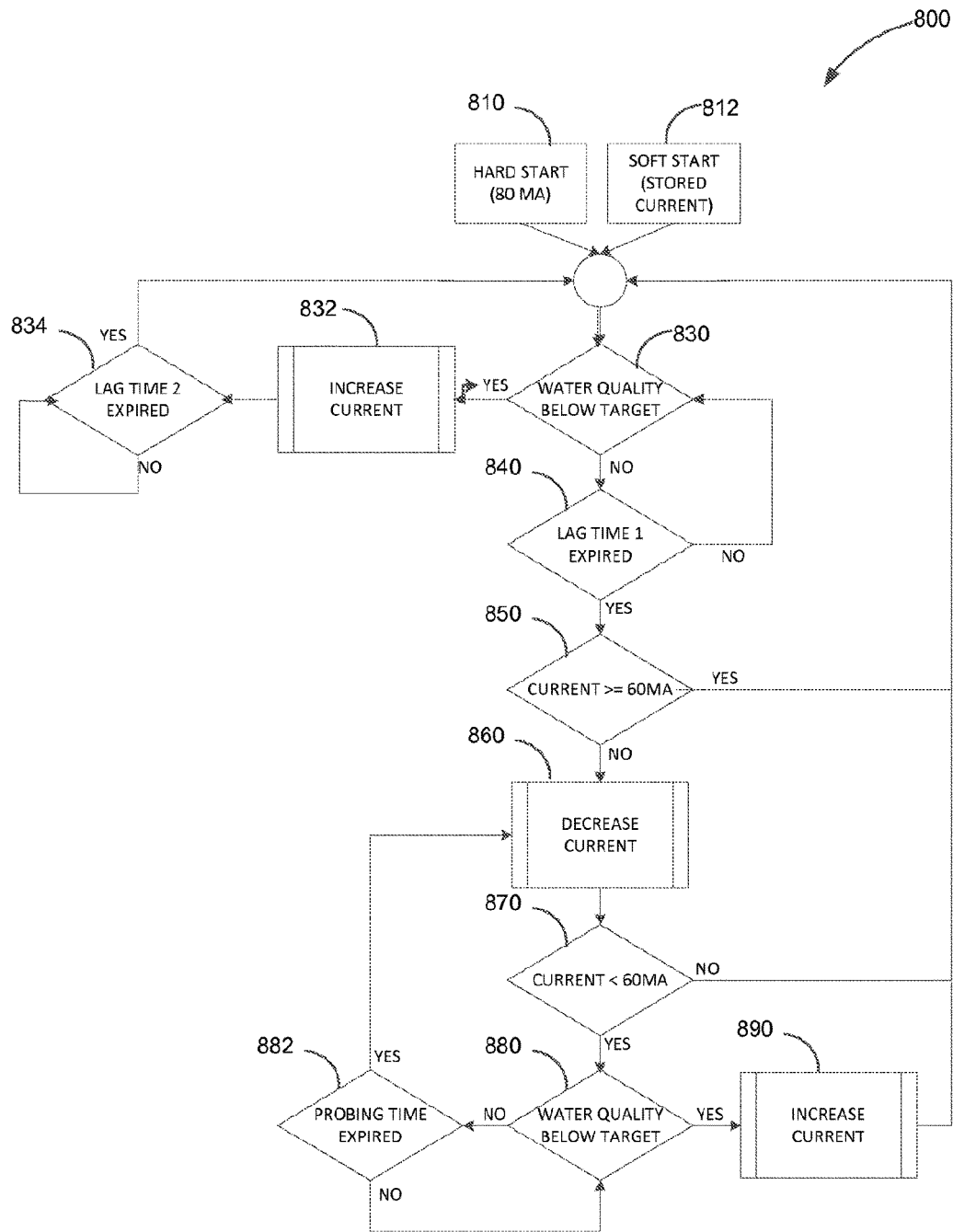
FIGS. 8-11 are flow diagrams of other embodiments according to the invention.
Figure 9:
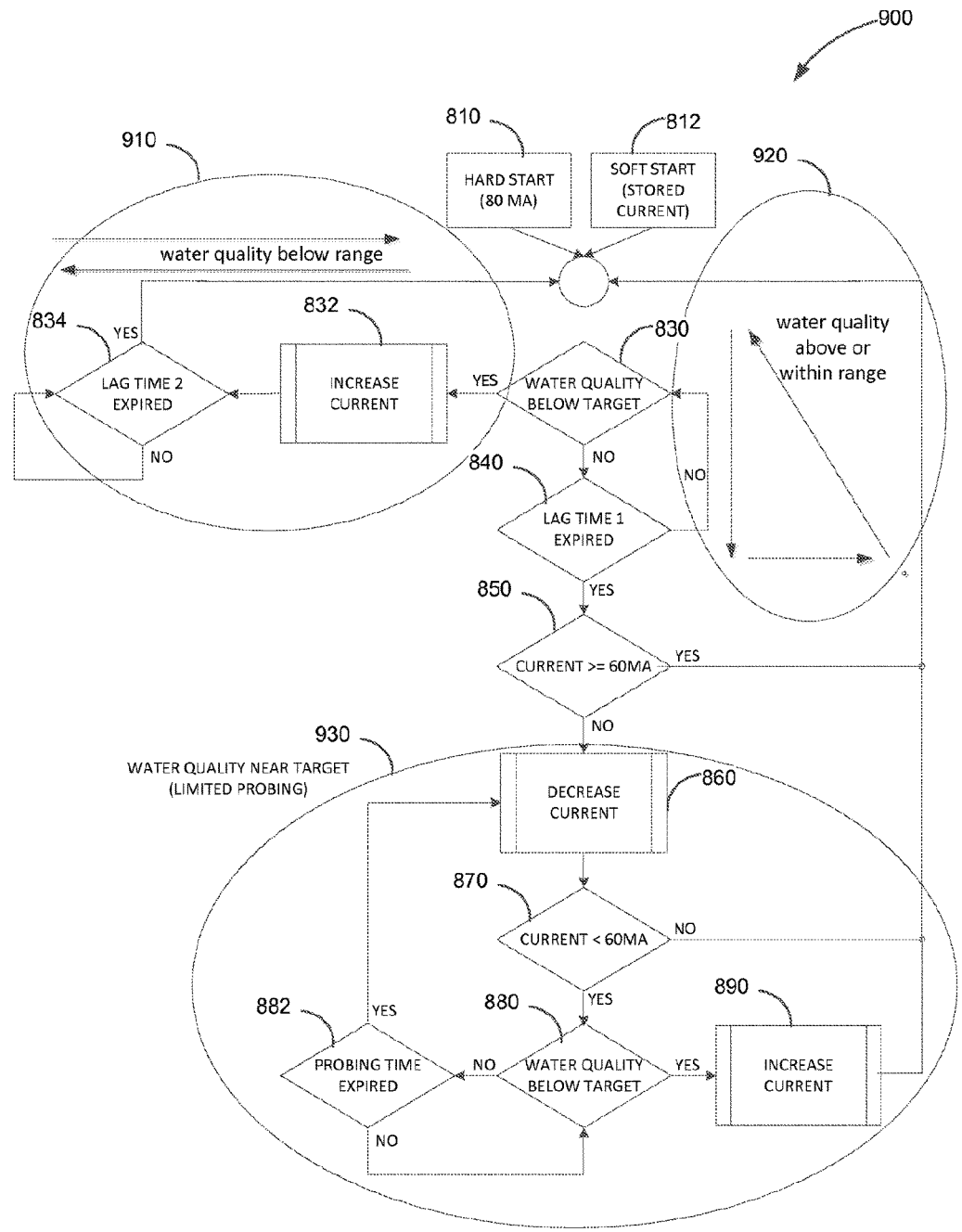
Figure 10:
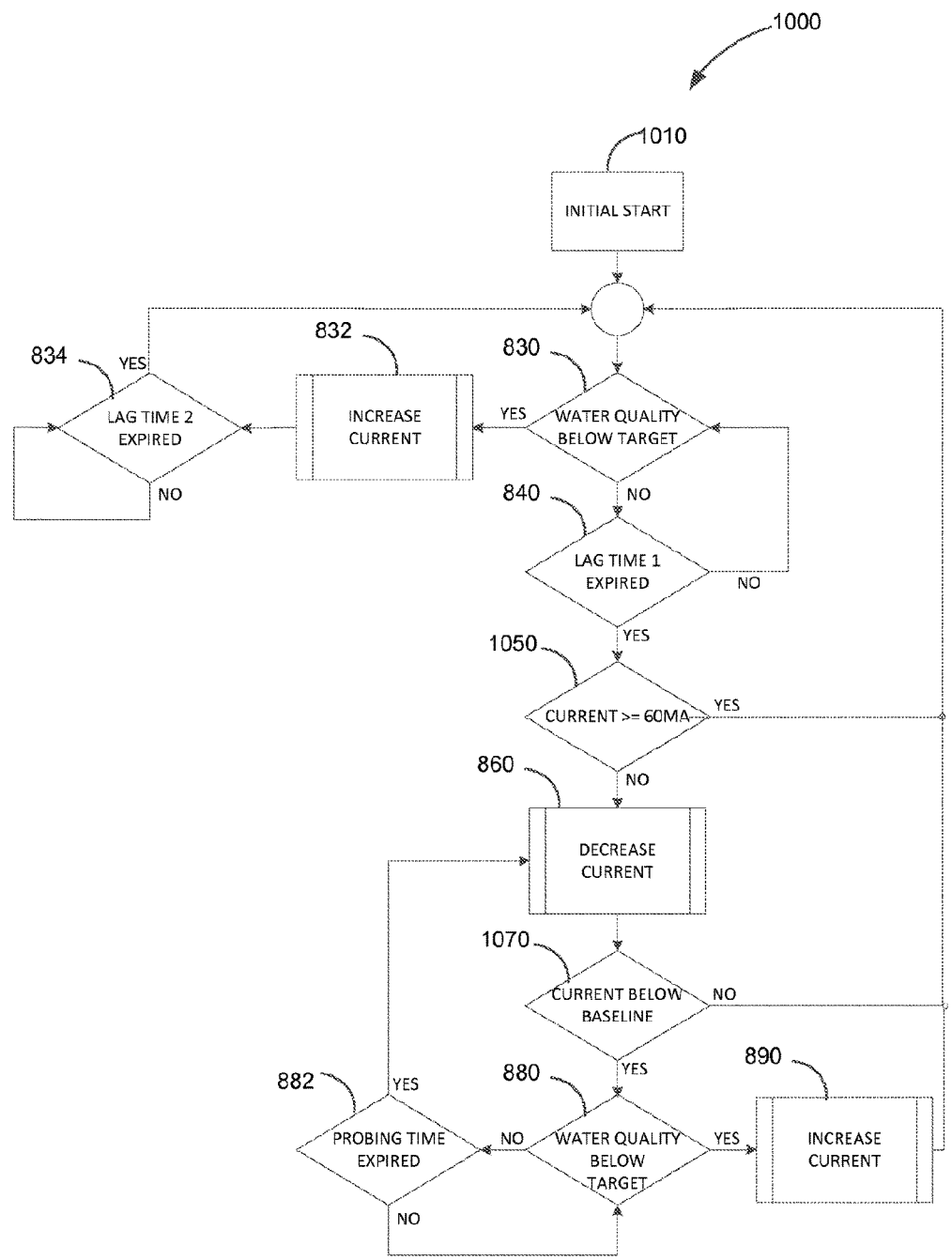

FIGS. 8, 9 and 10 show alternate embodiments where the power supply controller uses conductivity, for example, in units of nano-Siemens per centimeter [nS/cm]—rather than resistivity to measure the WQ of the purified water 11.

Conductivity is the inverse of resistivity according to the formula, Conductivity=1÷Resistivity. Using this formula, a resistivity of 10 MΩ·cm is equal to a conductivity of 100 nS/cm.

FIG. 8 shows an overall flow diagram 800 of the control logic for a power supply controller and operation of an EDI module 10 to produce purified water is shown. In this embodiment the power supply controller applies an initial current of 80 mA when the system is in the Hard Start state (instead of the highest possible current of the power supply 120 mA), with the minimum current being set at 60 mA (instead of the lowest possible current of 10 mA). Here the received range and the received target within the range for a water quality value of the purified water are combined into a target. In this embodiment, power is first applied to the EDI module 10 to bring the WQ within the received target and then the power is continuously adjusted by probing to maintain the WQ near the received target range for water quality. The process begins with either in processing block 810 a hard start with 80 mA applied to the EDI module 10 or in processing block 812 a soft start with a previously stored current applied to the EDI module 10.

At processing block 420, a water quality measurement (WQ) is received from a water quality sensor of the purified water (i.e. monitoring the purified water 20 produced from the EDI module 10) and it is determined whether the water quality is below a received target value. If the water quality is below the target, processing continues at processing block where the current to the EDI module 10 is increased, otherwise processing continues at processing block 840.

After the current is increased at processing block 832, a delay occurs using lag time 2, which enable the current increase in processing block 832 to affect the water quality and processing continues at processing block 830.

At processing block 840, a delay (lag time 1) occurs to continue checking water quality at processing block 830, and when the timer (lag time 1) expires the current is compared to a predetermined current, here 60 mA, in processing block 850. If the current being supplied to the EDI module 10 is greater than or equal to the predetermined value then processing continues at processing block 830, otherwise the current is decreased in processing block 860 and processing continues at processing block 870 where the current being supplied to the EDI module 10 again compared to the predetermined value, and if the current is less than the predetermined value then processing continues at processing block 880 where it is determined whether the water quality is below the target, otherwise processing continues at processing block 830.

Referring to FIG. 9, flow diagram 800 is annotated in flow diagram 900 to further explain the control system 100 in the embodiment described above in conjunction with FIG. 8. The control system process is shown in three loops or cycles, 910, 920 and 930, depending on whether the WQ is below (cycle 910) or above (cycle 920) the target (of the water quality), as well as a probing cycle (cycle 930) and labeled as "limited probing." The reference to a lag time indicates a predetermined delay before testing if the water quality is below the target and before a current level is tested, respectively. The predetermined lag times (lag time 1 and lag time 2) are used to compensate for the delay between changes in power application to the EDI module 10 and changes in measured WQ value. In one embodiment, the transfer function is adjusted to compensate for this delay to maintain the WQ near the received target for water quality.

FIG. 10 is a variation of the embodiment described in FIGS. 8 and 9. In this embodiment the operation of a hard start 810 and a soft start 812 is combined into an "initial start" 1010. The reference to a lag time indicates a predetermined delay before testing if the water quality if below the target. Other variations from the process 800 in FIG. 8 include processing block 1070 where the current is compared to the baseline current.

Figure 11:
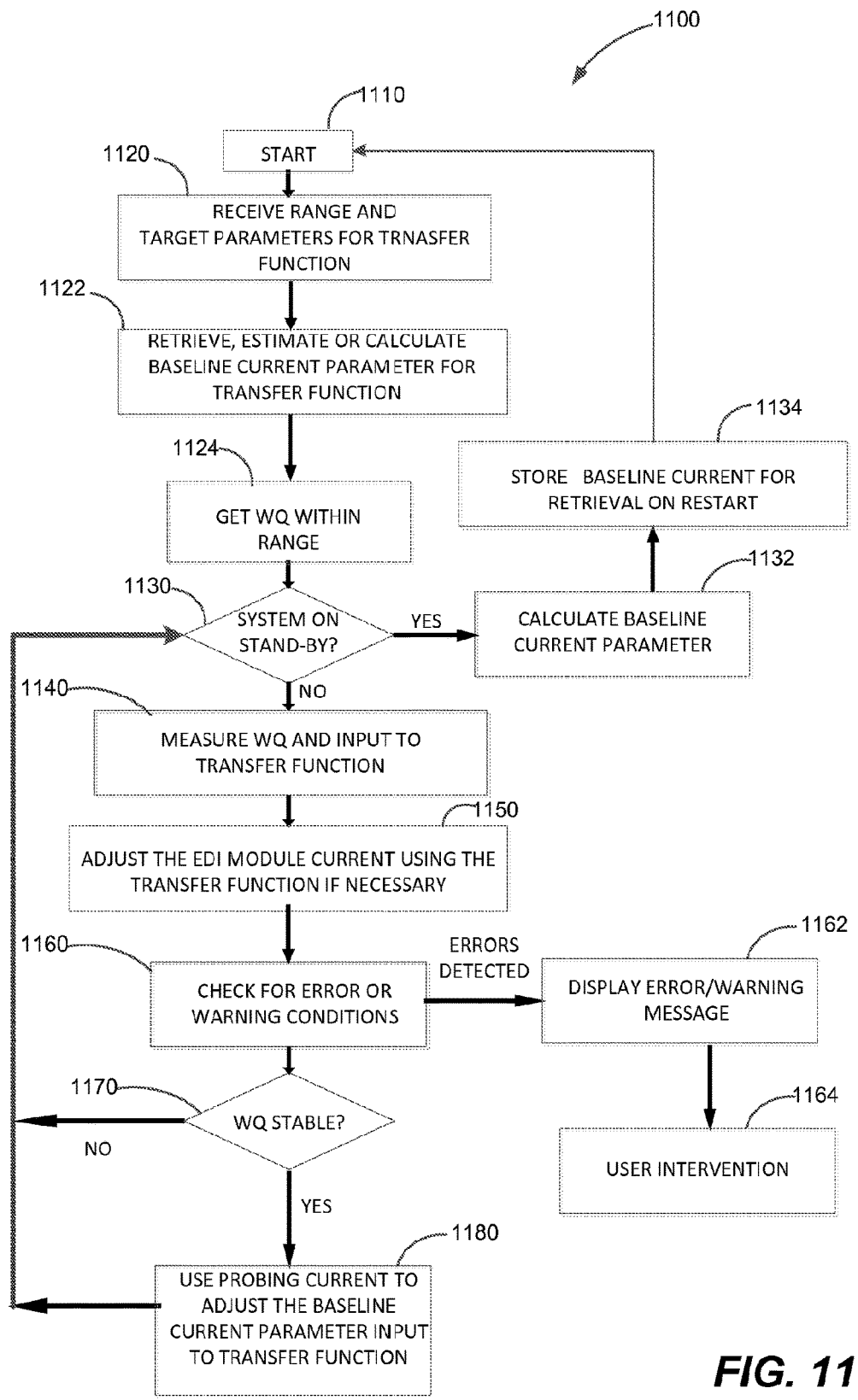

FIG. 11 shows flow diagram 1100 of one embodiment described by block diagram 340 in FIG. 3B. The system starts in step 1110, followed by receiving the values of the range and the target in step 1120 and retrieving, estimating or calculating the baseline current parameter in step 1122. Depending on the state of the system prior to start step 1110, the baseline current parameter is either estimated by a predetermined formula, entered by the installer into the system memory, or calculated from a previous run.

Immediately after step 1122 the system enters step 1124, whose objective is to get the water quality within range as quickly as possible. Accordingly, power supply controller 110 supplies either the maximum or the minimum current to the EDI module 10; the maximum current if the water quality is below the range; the minimum current if the water quality is above the range.

In step 1130 it is determined whether the system has been placed on stand-by mode. If the system 100 is on stand-by, the baseline current parameter is calculated in step 1132 based on the water quality vs. current profile after the start 1110 of the existing run and processing continues at step 1134, where the baseline current parameter is stored for retrieval on restart. Otherwise processing continues at step 1140. The system is put on stand-by mode either by the user or automatically by the system controller if the process downstream of the water purification system indicates to the system controller that the system should stop purifying water; the stand-by mode persists until demand for purified water is received by the system controller, at which point the system controller starts the water purification process, starting the EDI module 10 controller according to start step 1110.

Once the water quality is within the range the controller proceeds to step 1140, where the water quality is measured. The system proceeds to step 1150 where the transfer function uses the value of the water quality and the baseline current parameter, as well as the parameters range and target to calculate the current to be supplied to the EDI module 10. The current calculated by the transfer function becomes the current supplied to the EDI module 10 whenever the water quality is within the range.

In step 1160 the system checks for errors or warning conditions; if an error or warning condition is detected the system displays it to the user in step 1162. The user can intervene at step 1164 and decide how to proceed based on the error or warning. There are several possible errors which may occur, and the EDI module 10 controller includes algorithms for their detection.

One kind of error occurs when the electrical impedance of the module exceeds a certain critical value. When impedance is too high, the current controller may be unable to supply sufficient current to the EDI module 10 to produce good water quality. Accordingly, the controller calculates the electrical impedance of the module, and if it exceeds a predetermined critical value, an error message is generated alerting the user that the EDI module 10 is possibly at the end of its life and should be replaced as soon as possible.

Another kind of error occurs when the power supply current stays at the maximum value for a certain period of time and the system is unable to get the water quality within the range. This means that the ionic load to the EDI module 10 exceeds the maximum capacity of the module and system, and/or, that the EDI module 10 is damaged. The user is sent a message alerting that the feedwater to the EDI module 10 has too high an ionic load (either the feedwater has too high an ionic load or the RO cartridge is damaged) or that the EDI module 10 is damaged, requiring a service technician to diagnose the problem.

Another kind of error occurs when the power supply current is below the maximum even though the water quality is below the range. This means that the power supply is unable to supply the maximum current at a moment when that should be happening. This means that the power supply is damaged. The user is sent a message alerting that the power supply needs to be replaced.

The current modulating feature as disclosed herein in addition to maintaining the water quality within a narrow range enables the anticipation that an EDI module is close to the end of its useful service. Since the controller relies on the baseline current parameter to modulate/fine tune the current supplied to the EDI module 10, in one embodiment, the system tracks the change in the baseline current parameter over time. As explained above, the baseline current increases as the EDI module 10 and/or as the RO cartridge ages. Once the baseline current gets sufficiently close to the maximum current of the power supply, as measured by the baseline current parameter, it is only a matter of time before the system will no longer be able to maintain the water quality within the range. This feature ensures that the system will produce good water quality by indicating the need for preventive action, for example, preventive maintenance on the system.

In step 1170 the system determines if the water quality is stable. If the water quality is not stable, then processing resumes at step 1130. By stable it is meant that the change in water quality over time is relatively small; accordingly, the controller has been given parameters to determine what change in water quality over what period of time is considered stable.

Once the water quality is determined to be stable by the controller, processing continues at step 1180 where the baseline current parameter is adjusted. In one embodiment, the baseline current parameter is adjusted by using a probing current as described above.

While this invention has been particularly shown and described with references to preferred embodiments thereof, it will be understood by those skilled in the art that various changes in form and details (including hub and tube geometries) may be made therein without departing from the spirit and scope of the present application as defined by the appended claims. Such variations are intended to be covered by the scope of this present application. As such, the foregoing description of embodiments of the present application is not intended to be limiting, the full scope rather being conveyed by the appended claims.

What is claimed is:

1. A method of operating an electro-deionization (EDI) module to produce highly purified water from feed water comprising:
   receiving a range and a target within the range for a water quality value of the highly purified water;
   receiving values for the water quality (WQ) of the highly purified water from a water quality sensor;
   applying power to the EDI module to bring the WQ within the received range; and
   continuously adjusting the power to maintain the WQ near the received target within the range for water quality;
   saving a system state including a baseline current;
   restarting the EDI module initially using the baseline current; and
   wherein applying power to bring the WQ within the received range comprises applying one of a predetermined maximum initial power and a predetermined minimum initial power to the EDI module until the WQ is within the received range.

2. The method of claim 1, wherein applying power to bring the WQ within the received range comprises:
   determining an ionic load of feed water;
   predetermining for the EDI module a relationship between power requirements and the ionic load of the feed water; and
   applying power to the EDI module to supply a current as a function of the feed water ionic load and the power requirements of the EDI module.

3. The method of claim 2, wherein determining the ionic load of the feed water comprises:
   providing an EDI module with an approximately known excess capacity;
   applying a minimum power;
   measuring a time interval for a change in WQ; and
   determining the feed water ionic load as a function of the time interval, the approximately known excess capacity of the EDI module and the applied minimum power.

4. The method of claim 1, wherein continuously adjusting the power to maintain the WQ near the received target for water quality comprises:
   predetermining a transfer function to apply changes in power to the EDI module based on differences in the WQ and the received target water quality; and
   operating the EDI module in closed loop operation using the predetermined transfer function.

5. The method of claim 4 further comprising:
   adjusting the transfer function while operating the EDI module by probing the EDI module to determine the change in measured WQ as a function of a probing change in the power applied to the EDI module.

6. The method of claim 5, wherein the received range and target within the range for a water quality value of the highly purified water are combined into a target; and
   the method further comprises first applying power to the EDI module to bring the WQ within the received target and then continuously adjusting the power and probing to maintain the WQ near the received target for water quality.

7. The method of claim 4, wherein the transfer function is a Proportional, Integral, Derivative (PID) function or a derivative function.

8. The method of claim 4, wherein predetermining a transfer function comprises:
   calculating the transfer function using at least one purification factor.

9. The method of claim 8, wherein the at least one purification factor comprises at least one of:
   feed water ionic load;
   performance of reverse osmosis (RO) pretreatment of the feed water; and
   EDI module performance.

10. The method of claim 4 further comprising:
    determining a lag time between changes in power application to the EDI module and changes in measured WQ value; and
    adjusting the transfer function to compensate for the lag time when adjusting the power to maintain the WQ near the received target for water quality.

11. The method of claim 4, wherein the received range, the received target and a baseline current are parameters of the transfer function.

12. The method of claim 11, wherein the baseline current parameter is adjusted using a transfer function.

13. The method of claim 1, further comprising:
determining a maintenance power; and
applying the maintenance power when operation of the EDI module is stopped to counteract effects of back-diffusion.

14. The method of claim 1, wherein applying power to the EDI module to bring the WQ within the received range comprises applying at least one of:
a voltage; and
a current;
and wherein adjusting the power to maintain the WQ near the received target within the range comprises adjusting at least one of:
a voltage; and
a current.

15. The method of claim 1, further comprising controlling the water quality within a controllable range having a width less than or equal to about 5 MΩ·cm.

16. The method of claim 1, further comprising controlling the water quality within a controllable range having a width less than or equal to about 2 MΩ·cm.

* * * * *